United States Patent
Lee et al.

(10) Patent No.: US 7,709,128 B2
(45) Date of Patent: May 4, 2010

(54) SEPARATING PLATE FOR FUEL CELL (75) Inventors: Jong Hyun Lee, Seongnam-si (KR); Jae Jun Ko, Gunpo-si (KR); Young Min Kim, Dongducheon-si (KR); Seung Chan Oh, Yongin-si (KR); Hwan Soo Shin, Uiwang-si (KR); Ik Jae Son, Yongin-si (KR); Jong Jin Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 222 days.

(21) Appl. No.: 11/842,381

(22) Filed: Aug. 21, 2007

(65) Prior Publication Data
US 2008/0131755 A1 Jun. 5, 2008

(30) Foreign Application Priority Data
Dec. 5, 2006 (KR) ...................... 10-2006-0122270

(51) Int. Cl.
*H01M 2/14* (2006.01)
(52) U.S. Cl. .............................. 429/34; 429/13; 429/35; 429/32; 429/36; 429/39
(58) Field of Classification Search .................. 429/13, 429/34, 36, 39, 35, 32
See application file for complete search history.

(56) References Cited

U.S. PATENT DOCUMENTS
6,500,580 B1 * 12/2002 Marvin et al. .................. 429/39
2002/0119358 A1 * 8/2002 Rock ............................ 429/32

FOREIGN PATENT DOCUMENTS
| JP | 63-016576 | * | 1/1988 |
| JP | 04-289672 | * | 10/1992 |
| JP | 06-310158 | * | 4/1994 |
| JP | 06-310158 |   | 11/1994 |

* cited by examiner

*Primary Examiner*—Melvin C Mayes
*Assistant Examiner*—Colette Nguyen
(74) *Attorney, Agent, or Firm*—Morgan, Lewis & Bockius LLP

(57) ABSTRACT

A separating plate for a fuel cell includes first and second plates, each provided with a hydrogen channel, an oxygen channel, and a coolant channel. The first and second plates are attached to one another to form a main plate such that the first and second hydrogen, oxygen, and coolant channels compose main hydrogen, oxygen, and coolant channels, respectively. The main hydrogen and oxygen channels are fluidly isolated from each other. Distal ends of the main channels each communicate with a manifold through a communication passageway configured to supply hydrogen, oxygen, or coolant to a corresponding one of the main channels.

3 Claims, 8 Drawing Sheets

SEPARATING PLATE FOR FUEL CELL

CROSS-REFERENCE TO RELATED APPLICATIONS

This application claims the benefit under 35 U.S.C. §119(a) of Korean Patent Application No. 10-2006-0122270, filed in the Korean Intellectual Property Office on Dec. 5, 2006, the entire contents of which are incorporated herein by reference.

BACKGROUND OF THE INVENTION (a) Field of the Invention

The present invention relates to a separating plate for a fuel cell.

(b) Background Art

In general, a fuel cell system converts chemical energy having a fuel such as hydrogen, hydrocarbon, alcohol or the like into electric energy through an electrochemical reaction. Such a fuel cell system includes a fuel cell stack for generating electric energy, a fuel supply system for supplying fuel to the fuel cell stack, an air supply system for supplying the oxygen necessary for the electrochemical reaction to the fuel cell stack, and a heat and water control system for dissipating reaction heat and controlling the operational temperature of the fuel cell stack.

The information disclosed in this background of the invention section is only for enhancement of understanding of the background of the invention and should not be taken as an acknowledgement or any form of suggestion that this information forms the prior art that is already known to a person skilled in the art.

SUMMARY OF THE INVENTION

A separating plate for a fuel cell includes first and second plates, each provided with a hydrogen channel, an oxygen channel, and a coolant channel. The first and second plates are attached to one another to form a main plate such that the first and second hydrogen, oxygen, and coolant channels compose main hydrogen, oxygen, and coolant channels, respectively. The main hydrogen and oxygen channels are fluidly isolated from each other. Distal ends of the main channels each communicate with a manifold through a communication passageway configured to supply hydrogen, oxygen, or coolant to a corresponding one of the main channels.

The first hydrogen channel is at a front portion of the first plate. The second oxygen channel is at a front portion of the second plate. The first and second coolant channels are at rear portions of the first and second plates, respectively. The manifolds are disposed along a thickness direction of the plates. The main plate may be configured such that, in use, the hydrogen passes through a first hydrogen communication passageway disposed inclinedly in the thickness direction of the first plate and in communication with the hydrogen manifold at the rear portion of the second plate, and then is transferred to the main hydrogen channel.

The main plate may further be configured such that, in use, the oxygen passes through a first oxygen communication passageway disposed inclinedly in the thickness direction of the main plate and communicating with the oxygen manifold, and then in transferred to the main oxygen channel and discharged to an outlet manifold.

An adhesive material may be provided at least one of: the coolant communication passageway, the first coolant channel, and the second coolant channel.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF PREFERRED EMBODIMENTS

A common fuel cell stack is a solid proton exchange (also called polymer electrolyte) membrane fuel cell (PEMFC) having a high power density.

Figure 1:
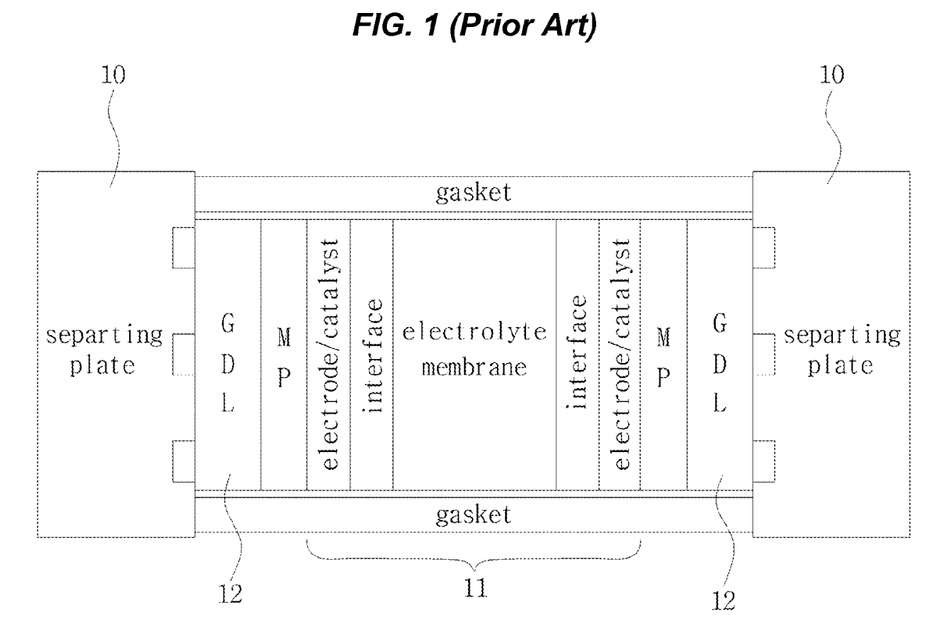
FIG. 1 is a schematic view illustrating the construction of a fuel cell stack according to the prior art.

Referring to FIG. 1, a typical fuel cell stack includes a membrane electrode assembly (MEA) 11 having an electrode/catalyst layer attached to either side of an electrolyte membrane across which hydrogen ions, i.e., protons are transported, the electrode/catalyst layer allowing an electrochemical reaction to occur therein, a gas diffusion layer (GDL) 12 for evenly distributing reaction gases and transferring the generated electricity, a gasket and clamping member for maintaining air-tightness and optimum flange pressure of reaction gases and cooling water, and a separating plate 10 for allowing the reaction gases and the cooling water to be transported thereacross.

Figure 2A:
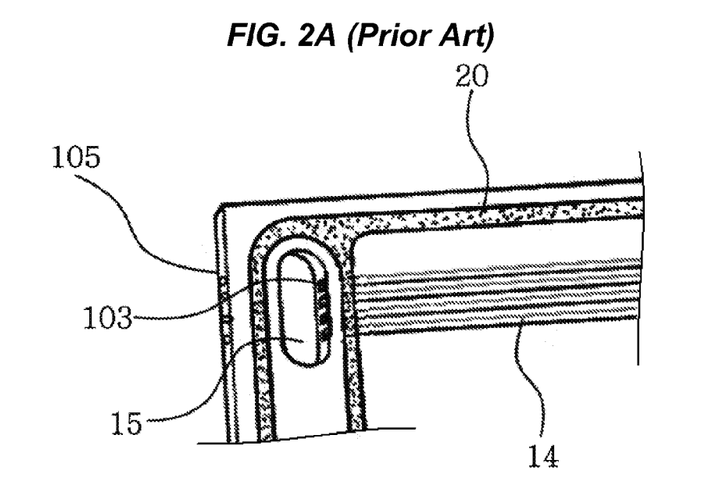
FIGS. 2A and 2B are partial perspective views illustrating a manifold and a fluid flow channel in a separating plate according to the prior art.

As shown in FIG. 2A, the separating plate 10 is configured such that a passageway 103 provides fluid communication between a manifold 15 and a fluid flow channel 14. The outer peripheral portion of the manifold 15 is filled with a filler 105 for outer sealing.

Figure 2B:
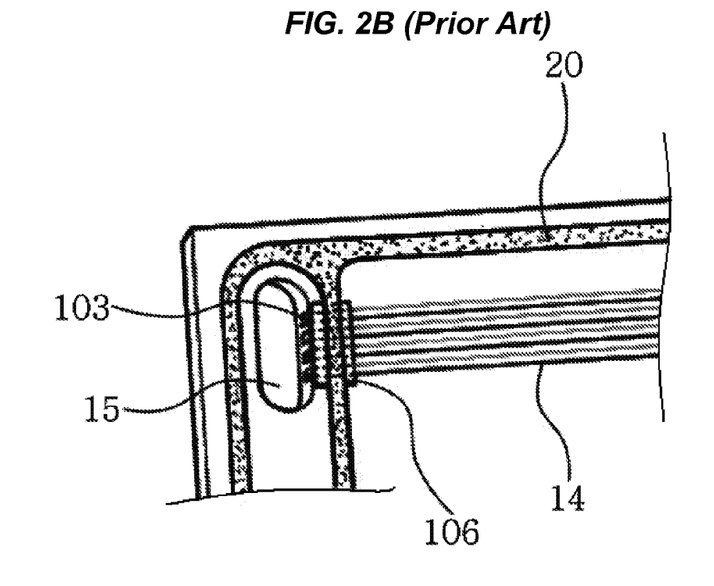
Figure 3:
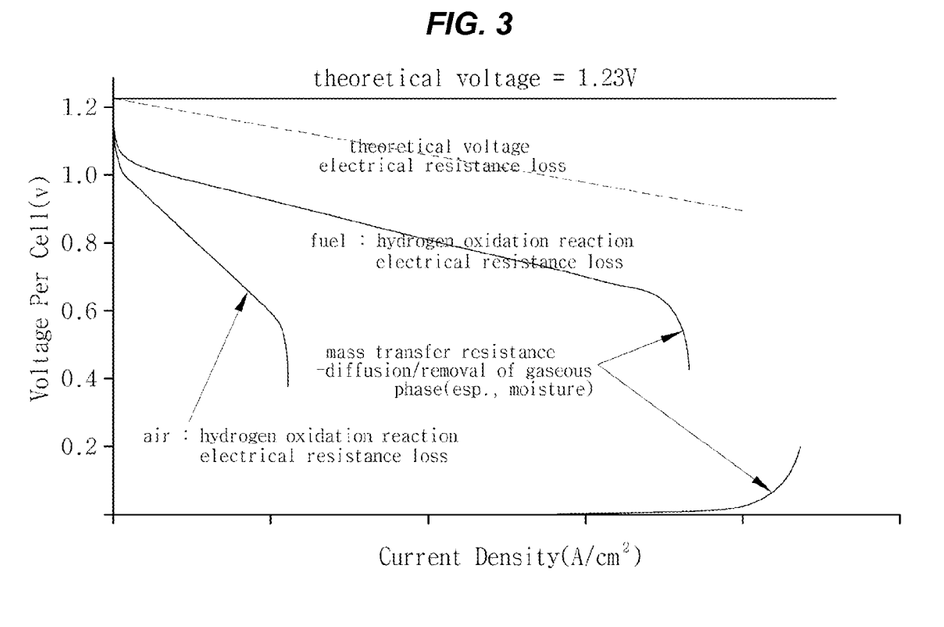
FIG. 3 is a graph illustrating a loss type of a fuel cell.

Also, as shown in FIG. 2B, in case where two separating plates 10 are bonded to each other, the manifold 15 and the fluid flow channel 14 are in the same plane, and a cover 106 for mounting a gasket is adhered to the intersection of the manifold 15 and the fluid flow channel 14.

However, such a separating plate 10 needs three fluid layers of different heights for three fluids, i.e., hydrogen, air, and cooling water, which must not mix with one another. This means the separating plate 10 must be very thick.

A solid polymer electrolyte membrane fuel cell (PEMFC) supplies hydrogen to an anode (also called "fuel electrode") and oxygen (air) to a cathode (also called "air electrode" or "oxygen electrode").

The hydrogen supplied to the anode is decomposed into protons ($H^+$) and electrons ($e^-$) by a catalyst of each of electrode layers on either side of the electrolyte membrane. Only the produced protons (H⁺) migrate from the anode to the cathode through the polymer electrolyte membrane. At the same time, the electrons (e⁻) are transported from the anode to the cathode through the gas diffusion layer (GDL) 12 and the separating plate 10.

In the cathode, the protons supplied from the anode through the polymer electrolyte membrane and the electrons supplied the anode through the separating plate 10 react with oxygen in the air supplied to the cathode through an air supply unit to produce water and energy. Current is generated by a flow of electrons through an external conductive wire due to migration of the protons, and heat is incidentally generated in the course of the water producing reaction.

The electrode reaction of such a solid polymer electrolyte membrane fuel cell (PEMFC) is as follows:

Reaction in fuel electrode: $2H_2 \rightarrow 4H^+ + 4e^-$

Reaction in air electrode: $O_2 + 4H^+ + 4e^- \rightarrow 2H_2O$

Overall reaction: $2H_2 + O_2 \rightarrow 2H_2O +$ electric energy+heat energy

However, since the conventional separating plate is thick, it has a relatively large temperature gradient in the thickness direction.

Thus, there occurs a reduced moisture redistribution effect of humidifying moisture necessary for the fuel cell reaction and reaction product moisture generated from the air electrode with respect to the overall area of a fuel cell reaction portion, thereby relatively decreasing power performance. Specifically, the effective transfer and removal of reaction heat is delayed, and flooding occurs, during which water is locally condensed in the fuel cell reaction portion, which results in a restriction of approach of the reaction gases to the membrane electrode assembly (MEA), thereby causing corrosion of a catalyst support in the air electrode. Moreover, the reaction heat is not effectively removed, causing a local drying of the electrolyte membrane, so that conductivity of the electrolyte membrane is reduced, deteriorating the performance of the fuel cell stack, or drying/wetting of the electrolyte membrane is repeated, depending on power load variation, inducing separation of an interface between an electrolyte membrane and an electrode (composed of a catalyst and a catalyst support) constituting the membrane electrode assembly (MEA), thereby having an adverse effect on performance and durability of the fuel cell stack.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

A solid polymer electrolyte membrane fuel cell (PEMFC) has a theoretical voltage of 1.23V. Its performance and efficiency depend upon the amount of load and the type and amount of an electrical resistance loss generated. More specifically, this means that the accumulated amount of electrical resistance losses occurring from the component units constituting each cell when components are stacked in the form of the fuel cell stack, such as in the construction of a general fuel cell stack of FIG. 1, should be minimized. Also, this means that the performance and efficiency of the fuel cell stack depend upon the fact that respective individual unit cells maintain air-tightness to tightly seal the reaction gases and the cooling water, have good electrical contact with one another, and the oxygen reduction reaction or the hydrogen oxidation reaction of FIG. 1 and mass transfer resistance are minimized in each unit cell.

A fuel cell stack and design factors of its constituent components will now be described.

Figure 4A:
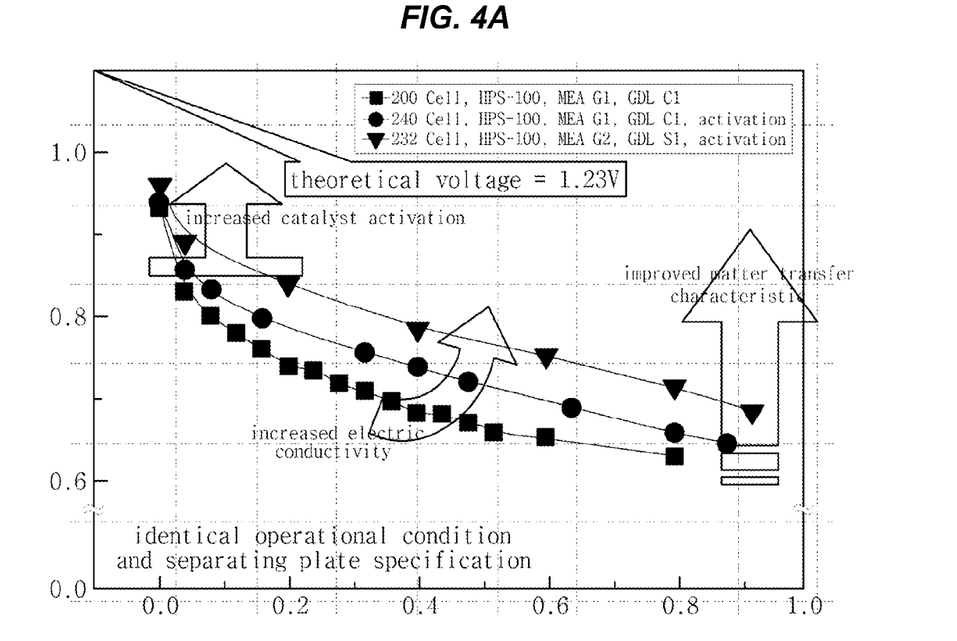
FIGS. 4A and 4B are graphs illustrating a design factor for improving the performance of a fuel cell stack.
Figure 4B:
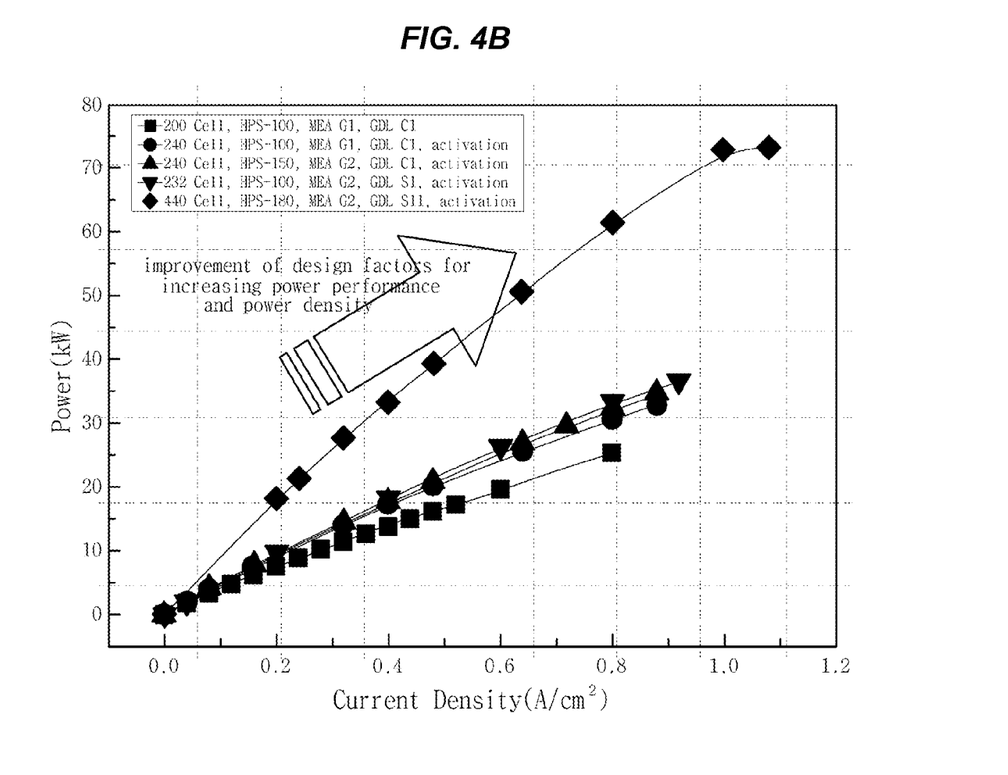

A fuel cell stack for a vehicle must achieve a high power density due to limited space. To this end, as shown in FIG. 4, three requirements, i.e., increased catalyst activation, increased electrical conductivity, and improved mass transfer characteristics, should be satisfied, and components suitable for high power should be designed and developed to obtain a power of more than 80 kW needed for the driving of the vehicle. In addition, it is necessary to prepare design restraints such as a limitation in the number of cells stacked in the fuel cell stack and the maximum allowable current during operation due to limited operating voltage and the maximum allowable current of a fuel cell system and a fuel cell stack determined by a specification of a driving system composed of a motor, a motor controller and the like directly involved in the driving of a vehicle, and basically include the insulation design of constituent components capable of securing the security of a driver and passengers.

Details on such design factors can be roughly classified into the following two types:

1) High Power

The number of cells stacked, increase in reaction area

Stack activation technology/operation optimization technique development

Control of operation variables such as operation temperature, relative humidity, operation pressure, etc.

Internal resistance reduction (optimized stack fastening condition, controlled interface between MEA 11 and GDL 12)

Mass transfer characteristic improvement (control of interface between and surface characteristic of MEA 11, GDL 12, and separating plate 10)

2) High Power Density

Improvement of the separating plate 10: fluid flow channel design, optimization, thinness, etc., of manifold 15

Common distribution, fastening mechanism improvement (minimized dead space)

Enhancement of current density of MEA 11 (improved material property)

Optimization of a cooling structure and improvement of mass transfer characteristics Moreover, pressure difference in constituent components (especially, a fuel cell stack) of the fuel cell system should decrease in order to reduce energy used for the air supply unit, which consumes the most power in the fuel cell system.

In addition, it is required to suitably design the material of the separating plate 10 and the size and shape of the manifold 15 and the fluid flow channel to manage moisture that influences the mass transfer characteristics so as to prevent deterioration of power performance in various load conditions.

A structure that increases degrees of freedom for adjustment of the number of manifolds and fluid flow channels of the cooling separating plate 10 and reduces the thickness of the cooling separating plate 10 is therefore desirable. One exemplary structure will now be described in detail.

As shown in FIG. 1, a fuel cell stack used as a driving power source for a vehicle is configured a repeated lamination of unit cells (consisting of separating plate 10, GDL 12, MEA 11, GDL 12 and separating plate 10).

The separating plate 10 is constructed such that each of two thin flat plates made of a graphitic material (or metallic material) is formed at one surface thereof or at both surfaces thereof, if necessary, with a fluid flow channel for allowing reaction gases to pass therethrough and a fluid flow channel for allowing cooling water pass therethrough by means of mechanical machining or molding machining, and then the two flat plates formed with the fluid flow channels are bonded to each other into a single cooling separating plate 10.

As such, a cooling separating plate 10 constructed by machining two plates and then bonding the plates into a single piece, gas fluid channels 14a and 14b are provided on either surface of the separating plate 10 to provide a flow of hydrogen and air through two separate fluid flow channels, and a cooling water flow channel 14c is provided at an intermediate portion of the separating plate 11.

Also, the distal ends of the flow channels 14a, 14b and 14c fluidly communicate with manifolds 15a, 15b and 15c through communication passageways 13a, 13b and 13c, respectively.

In addition, a tubular gasket, a gasket with a rib structure, or an O-ring-shaped gasket is fit around the outer peripheries of the fluid flow channels 14a and 14b and the manifolds 15a and 15b to prevent hydrogen and air (oxygen) from leaking at a contact portion between a hydrogen electrode and an air (oxygen) electrode.

The cooling water flow channel 14c is isolated from the hydrogen and oxygen communication passageways 13a and 13b by means of an adhesive material 16 to maintain air-tightness.

Since the separating plate 10 requires space for mounting a gasket between the manifold 15 and the fluid flow channel, a communication passageway must be formed at a lower portion of the gasket mounting space to fluidly communicate the manifold 15 with the fluid flow channel in the thickness direction of the separating plate 10.

Figure 5:
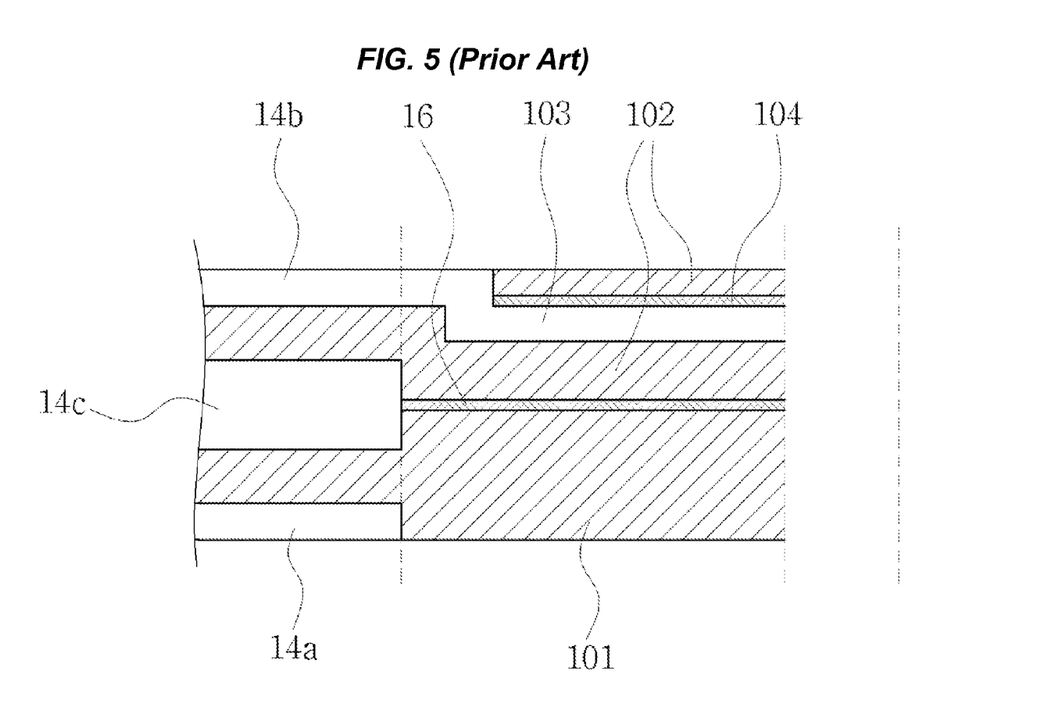
FIG. 5 is a cross-sectional view illustrating a communication passageway between a manifold and a fluid flow channel in a separating plate according to the prior art.

Conventionally, as shown in FIG. 5, a communication passageway 103 for fluidly communicating the manifold 15 with the fluid flow channels 14a, 14b and 14c is bent along a cross-sectional direction of the separating plate 100. This bent structure supports a load for a cover of a type covering a lid with a groove for mounting a gasket bonded with a sealing member 104.

The upper surface of the communication passageway 103 covers the lid by using the sealing member 104, and the groove for mounting the gasket is secondarily formed at a lid portion bonded to the separating plate 100 by using the sealing member 104.

It is required to secure a sufficient cross-sectional area of the communication passageway through which the reaction gases pass while minimizing a pressure drop at a fluid flow channel portion where an actual reaction of the reaction gases occurs.

Thus, in case of machining and bonding two thin flat plates, the separating plate 100 is thick, resulting in an increase in the volume of the overall fuel cell stack. In the prior art, the thickness of the separating plate 100 of this type was reduced to 2.8 mm.

In contrast, according to exemplary embodiments of the present invention, as shown in FIGS. 6A, 6B, 7A, 7B, 7C and 7D, a front portion of a first flat plate 18 includes a hydrogen manifold 15i a, a hydrogen flow channel 14a, and a hydrogen communication passageway 13a below a rear portion of the first flat plate 18 for fluidly communicating the hydrogen manifold 15a and the hydrogen flow channel 14a, a connection hole 17a with an open end, air and cooling water manifolds 15b and 15c, and a gasket groove 20 for mounting a gasket to allow hydrogen to be transferred to a fluid flow channel of a fuel cell reaction portion from the hydrogen manifold 15a.

Also, a rear portion of the first flat plate 18 includes the hydrogen manifold 15a, the hydrogen communication passageway 13a, the air manifold 15b, an oxygen communication passageway 13b, the cooling water manifold 15c, a cooling water communication passageway 13c, a cooling water flow channel communicating with the cooling water manifold 15c, and an adhesive groove 21. The hydrogen communication passageway 13a provides fluid communication between the hydrogen flow channel 14a through the connection hole 17a and is open at its end. The oxygen communication passageway 13b communicates with the air manifold 15b and is closed at its end. The cooling water communication passageway 13c and the cooling water flow channel communicate with the cooling water manifold 15c. The adhesive groove 21 has a combined air-tightness and adhesion at the time of the bonding of the cooling separating plate 10 to the fuel cell stack after the separation of a cooling water line and a gas line.

A front portion of a second flat plate 19 includes an air (oxygen) manifold 15b, an air (oxygen) flow channel 14b and an oxygen communication passageway 13b below a rear portion of the second flat plate 19 for providing fluid communication between the air (oxygen) manifold 15b and the air (oxygen) flow channel 14b. The front portion of the second plate also includes a connection hole 17b opened at its end, hydrogen and cooling water manifolds 15a and 15c and a gasket groove 20 for mounting a gasket so as to allow air (oxygen) into a fluid flow channel of the fuel cell reaction portion from the oxygen manifold 15b.

Also, a rear portion of the second flat plate 19 includes the air (oxygen) manifold 15b, the oxygen communication passageway 13b, the hydrogen manifold 15a, a hydrogen communication passageway 13a, the cooling water manifold 15c, the cooling water communication passageway 13c, a cooling water flow channel, and the adhesive groove 21. The oxygen communication passageway 13b fluidly communicates with the air (oxygen) flow channel 14b through the connection hole 17b and is opened at its end. The hydrogen communication passageway 13a communicates with the hydrogen manifold 15a and is closed at its end. The cooling water flow channel communicates with the cooling water manifold 15c. The adhesive groove 21 has air-tightness and adhesion at the time of the bonding of the cooling separating plate 10 to the fuel cell stack after the separation of the cooling water line and the gas line.

The first flat plate 18 and the second flat plate 19 are bonded to each other centered on the cooling water flow channel 14c providing a single cooling separating plate 10.

Figure 6A:
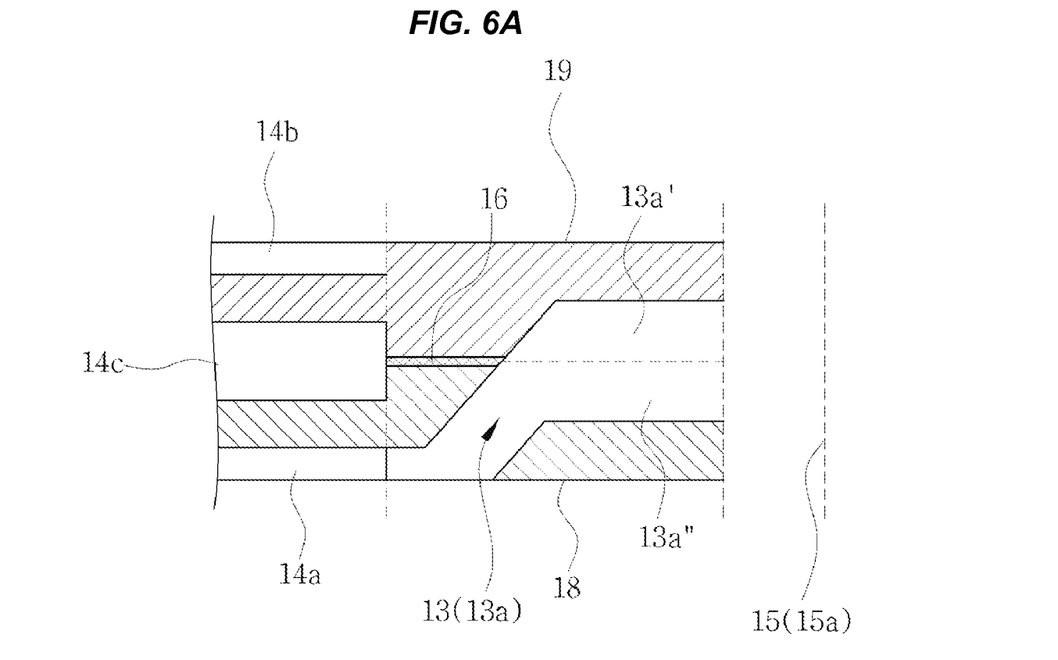
FIGS. 6A and 6B are cross-sectional views illustrating an oxygen/hydrogen communication passageway between a manifold and a fluid flow channel in a separating plate according to the present invention.
Figure 6B:
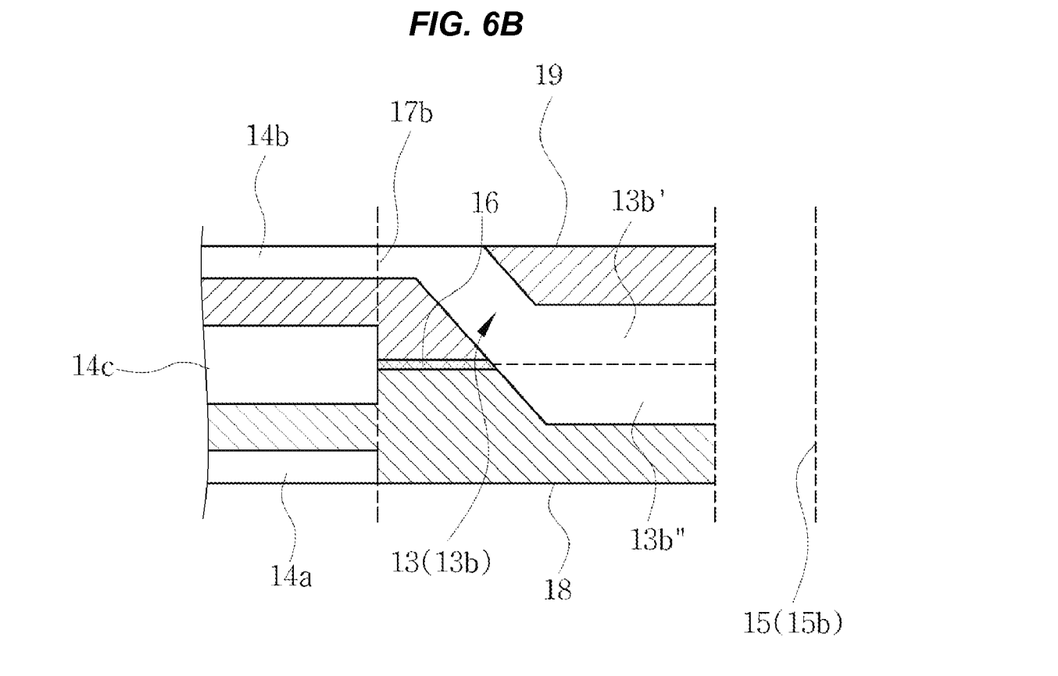
Figure 7A:
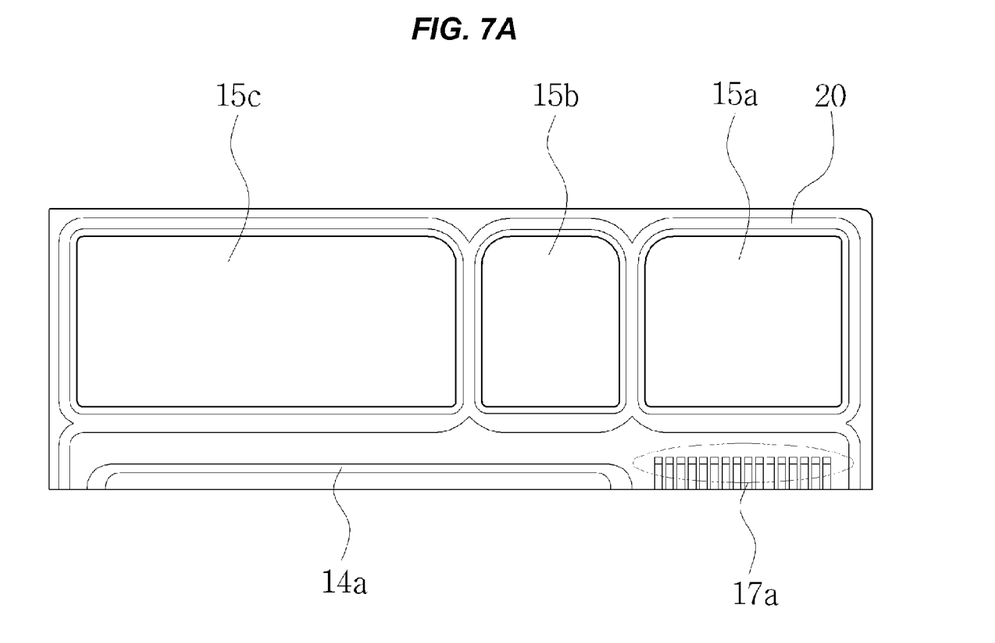
FIGS. 7A-7D are views illustrating the construction of a cooling separating plate according to the present invention.
Figure 7B:
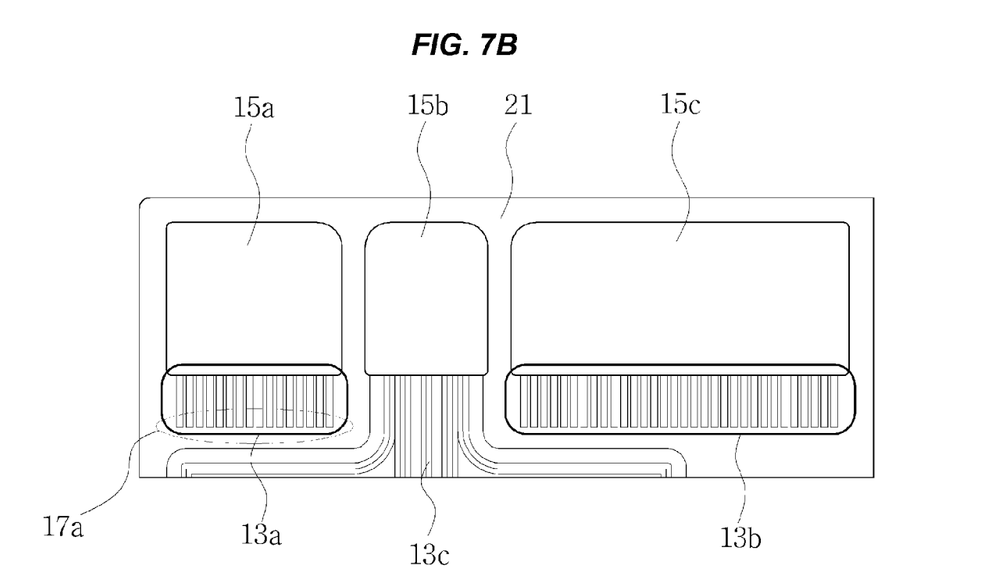
Figure 7C:
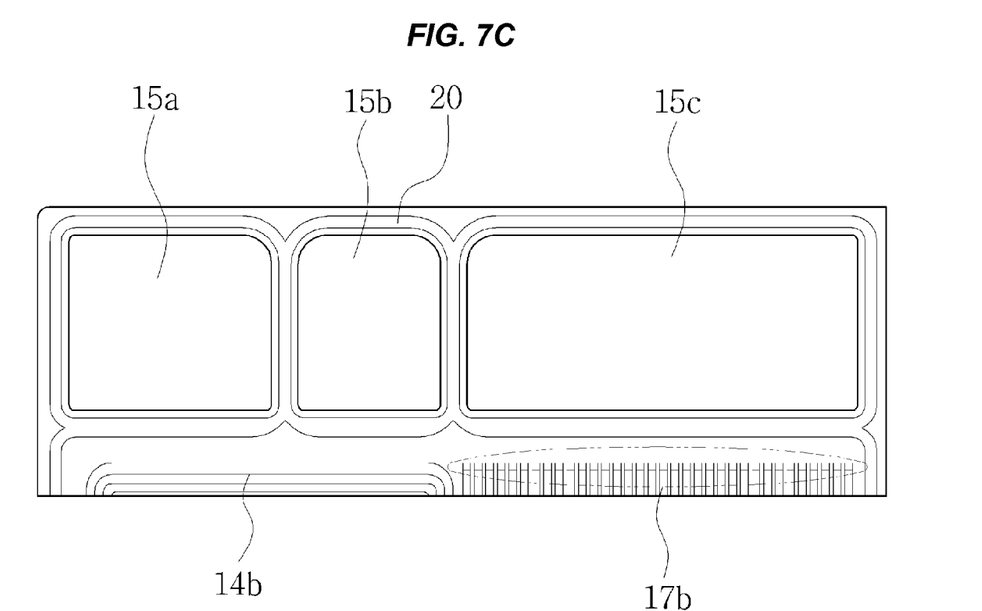
Figure 7D:
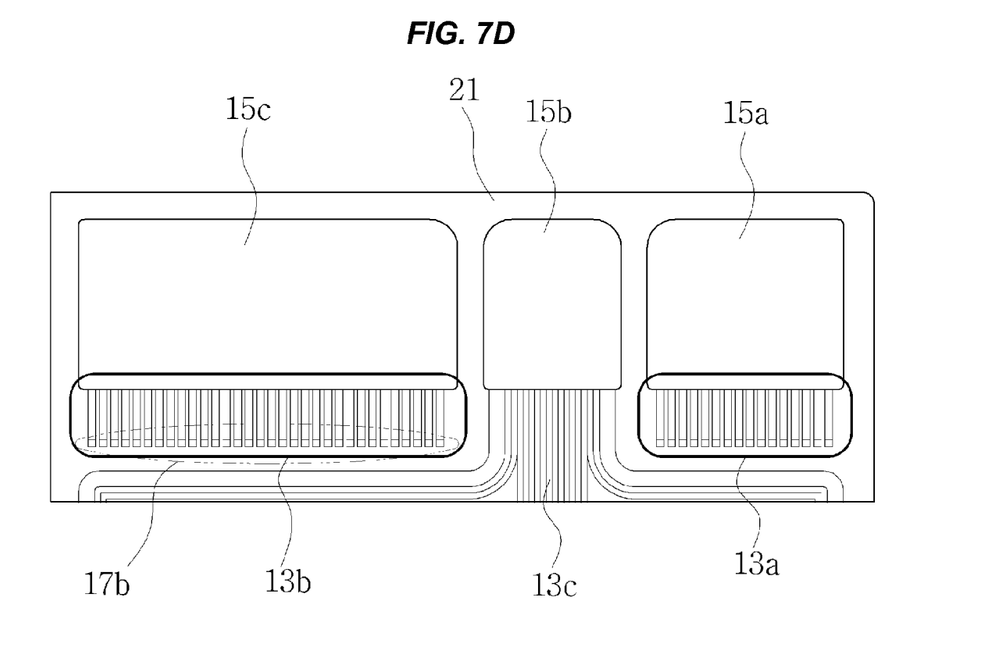

In such a cooling separating plate 10, hydrogen passes through the hydrogen communication passageway 13a having a cross section obtained by adding the cross-section of the communication passageway 13a', communicating with the connection hole 17a formed inclinedly in a thickness direction of the separating plate 10 so as to allow an end of the rear portion of the first flat plate 18 at an inlet manifold 15a to fluidly communicate with the hydrogen flow channel 14a of the fuel cell reaction portion, and the cross section of the communication passageway 13a" communicating with the hydrogen manifold 15a at the rear portion of the second flat plate 19 and closed at its end thereof, and then is transferred to the hydrogen flow channel 14a of the fuel cell reaction portion at the front portion of the first flat plate 18 via the connection hole 17a. Then, the residual hydrogen and humidifying moisture that have passed through the hydrogen flow channel 14a are discharged to an outlet manifold and then the outside through a hydrogen communication passageway having the same construction as that of the hydrogen communication passageway 13a.

Simultaneously, the air passes through the air (oxygen) communication passageway 13b, having a cross section obtained by adding the cross-section of the communication passageway 13b' communicating with the connection hole 17b formed inclinedly in a thickness direction of the separating plate 10 so as to allow an end of the rear portion of the second flat plate 19 at an inlet manifold 15b to fluidly communicate with the air (oxygen) flow channel 14b of the fuel cell reaction portion, and the cross section of the communication passageway 13b" communicating with the air (oxygen) manifold 15b at the rear portion of the first flat plate 18 and closed at its end thereof, and then is transferred to the air (oxygen) flow channel 14b of the fuel cell reaction portion formed at the front portion of the second flat plate 19 via the connection hole 17b. Then, the residual air (oxygen) and reaction product water that have passed through the air (oxygen) flow channel 14b are discharged to an outlet manifold and then the outside through an air (oxygen) communication passageway having the same construction as that of the air (oxygen) communication passageway 13b.

In addition, the cooling water flows in an intermediate portion of the cooling separating plate 100 while individual unit cells maintain air-tightness so that the cooling water and the reaction gases are not mixed with each other by means of the adhesive material 16 disposed at the adhesive groove 21 through a cooling water manifold 15c at least one of the rear portions of the first and second flat plates 18 and 19, a cooling water communication passageway 13c, and a cooling water flow channel 14c.

The cooling separating plate 10 is divided into two flat plates so that the total cross-section of the communication passageways of the first and second flat plates 18 and 19 can be reduced up to 50% over the prior art. In addition, the two flat plates have the same flow rate and the same number of channels as the conventional separating plate 100 formed as a single plate.

This communication passageway can minimize a pressure drop even in cases where a large amount of fluid passes therethrough when the reaction gases are transferred to the gas flow channel side from the manifold 15, and it has an inclined shape to prevent the moisturizing water supplied for the purpose of the fuel cell reaction from being easily condensed at the communication passageway.

Further, since the inventive cooling separating plate 10 allows the shape of the communication passageway to be more freely modified as compared to the conventional cooling separating plate, the size of each manifold and the number of the fluid flow channels can be easily controlled. Thus, it is possible to increase the size of the air manifold 15b and the number and the cross section of fluid flow channels in the separating plate 10 necessary to decrease the operation pressure of the fuel cell system to minimize the consumed power of the air supply unit, thereby minimizing a differential pressure generated from the fuel cell stack.

In the present invention, the use of the shape of the manifold of the separating plate 10 for allowing the reaction gases to be introduced to the fluid flow channel of the separating plate 10 allows the user to recognize a structure suitable for the relative position identification of the separating plate 10 during the assembly of the separating plate 10 to secure assemblability of the fuel cell stack through the use of a degree of freedom for the shape modification of the manifold 15.

Figure 8:
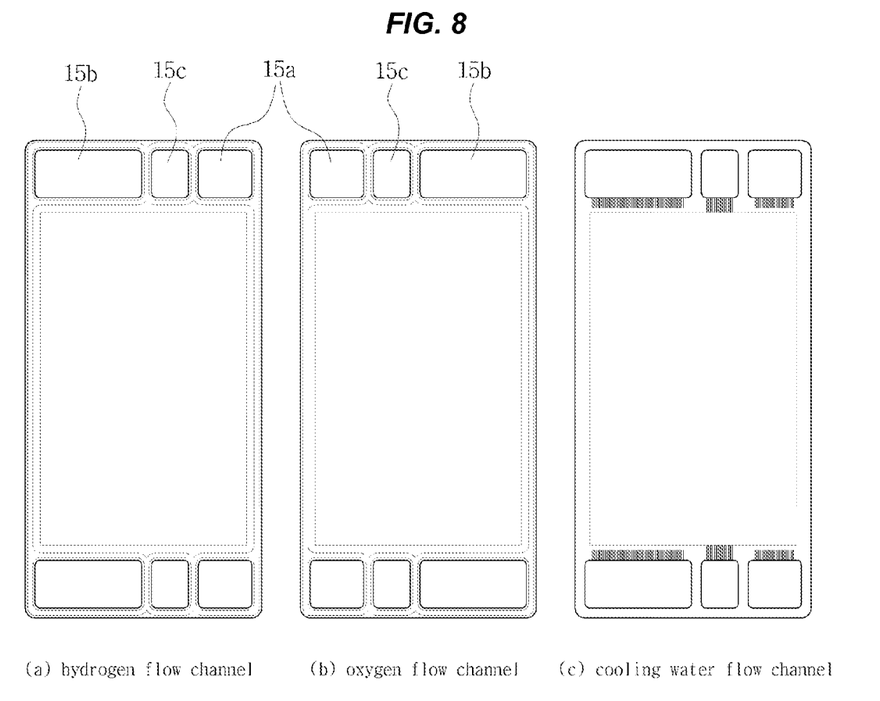
FIG. 8 is a schematic view illustrating the shape of a hydrogen channel, an air flow channel, and a cooling water flow channel according to an embodiment of the present invention.

More specifically, the sizes of the air and hydrogen manifolds 15b and 15a may be different from each other and the separating plate 10 is symmetrical even during the 180 degree rotation, so that the separating plate 10 is assembled in an intended state required by the fuel cell stack to secure assemblability, and an example of this configuration is shown in FIG. 8.

Moreover, in this configuration, the fluid flow channel inside the reaction area of the separating plate 10 can be constructed in various shapes.

The fuel cell stack employing the separating plate 10 according to the present invention is thinner and has a relatively small temperature gradient in the thickness direction of the separating plate 10 as compared to the conventional fuel cell stack in the course of transfer of heat. Thus, it is possible to achieve an improved moisture redistribution effect of humidifying moisture necessary for the fuel cell reaction and reaction product moisture generated from the air electrode with respect to the overall area of a fuel cell reaction portion, thereby increasing power performance.

Specifically, in a use in which there is a great change in power such as in a vehicle, the effective transfer and removal of reaction heat is promoted, so that it is possible to prevent a catalyst support in the air electrode from being corroded by a restriction of approach of the reaction gases to the membrane electrode assembly (MEA) due to water flooding. Also, it is possible to provide improved characteristics of various factors having an adverse effect on performance and durability of the fuel cell stack such as in the case where the reaction heat generated from the air electrode is not effectively removed to thereby cause a local drying of the electrolyte membrane, so that ion conductance of the electrolyte membrane is reduced, or the drying/wetting of the electrolyte membrane is repeated depending on a power load variation, inducing separation of an interface between an electrolyte membrane and an electrode.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A separating plate for a fuel cell, comprising:
    first and second plates, each provided with a hydrogen channel, an oxygen channel, and a coolant channel to form first and second hydrogen, oxygen and coolant channels, wherein the first and second plates are attached to one another to form a main plate such that the first and second hydrogen, oxygen, and coolant channels compose main hydrogen, oxygen, and coolant channels, respectively;
    wherein the main hydrogen and oxygen channels are fluidly isolated from each other; and
    wherein distal ends of the main channels each communicate with a manifold through a communication passageway configured to supply hydrogen, oxygen, or coolant to a corresponding one of the main channels, wherein:
    the first hydrogen channel is disposed at a front portion of the first plate;
    the second oxygen channel is disposed at a front portion of the second plate;
    the first and second coolant channels are disposed at rear portions of the first and second plates, respectively;
    the manifolds are disposed along a thickness direction of the plates; and
    the main plate is configured such that, in use, the hydrogen passes through a first hydrogen communication passageway inclined in the thickness direction of the first plate and in communication with the hydrogen manifold at the rear portion of the second plate, and then is transferred to the main hydrogen channel.

2. The separating plate of claim 1, wherein the main plate is configured such that, in use, the oxygen passes through a first oxygen communication passageway disposed inclinedly in a thickness direction of the main plate and communicating with the oxygen manifold, and then in transferred to the main oxygen channel and discharged to an outlet manifold.

3. The separating plate for a fuel cell of claim 1, further comprising an adhesive material disposed at at least one of: the coolant communication passageway, the first coolant channel, and the second coolant channel.

* * * * *